United States Patent Office 3,749,749
Patented July 31, 1973

3,749,749
PRODUCTION OF 2,2-DIALKYL-3-ACYLOXYPROPANALS
Franz Merger and Werner Fuchs, Ludwigshafen, and Toni Dockner, Meckenheim, Germany, assignors to Badische Anilin- & Soda-Fabrik Aktiengesellschaft, Ludwigshafen am Rhine, Rineland-Pfalz, Germany
No Drawing. Filed Jan. 5, 1971, Ser. No. 104,121
Claims priority, application Germany, Jan. 7, 1970, P 20 00 511.2
Int. Cl. C07c 69/74, 67/00, 69/02
U.S. Cl. 260—468 R                 8 Claims

ABSTRACT OF THE DISCLOSURE

The production of 2,2-dialkyl-3-acyloxypropanals by acyloxymethylation of secondary aldehydes with carboxylic acids and formaldehyde in the presence of strong acids with simultaneous removal of water from the reaction mixture. The compounds prepared by the process according to the invention are valuable starting materials for the production of pesticides, polymers and dyes.

---

The invention relates to a process for the production of 2,2-dialkyl-3-acyloxypropanals by acyloxymethylation of secondary aldehydes with carboxylic acids and formaldehyde in the presence of strong acids with simultaneous removal of water from the reaction mixture.

It is known that acetoxypivalaldehyde can be prepared by esterification of 2,2-dimethyl-3-hydroxypropanal with acetic acid (U.S. Pat. 3,251,876). The synthesis of 2,2-dialkyl-3-alkanoyloxypropanals from monobasic carboxylic acids, formaldehyde and dialkylacetaldehydes by heating in the presence of mineral acids at from 50° to 120° C. is described in U.S. Pat. 3,374,267. An article in Annalen der Chemie 627 (1959), 96 to 106, describes the condensation of isobutyraldehyde, formaldehyde and acetic acid. The said methods give mixtures of acyloxypivalaldehyde, hydroxypivalaldehyde and often a considerable proportion of higher condensation products of hydroxypivaldehyde alone or of its adduct with for example acetoxypivalaldehyde. The yields of β-acyloxyaldehydes are consequently low. Moreover it is difficult to isolate the β-acyloxyaldehydes because they differ only slightly in their boiling points from the β-hydroxyaldehydes. The presence of β-hydroxyaldehydes makes further processing, for example in oxidation with oxygen to form β-acyloxycarboxylic acids (U.S. Pat. 3,251,876) more difficult.

It is an object of this invention to provide a new process for the production of 2,2-dialkyl-3-acyloxypropanals in a simpler and more economical way, in better yields and purity and without substantial resin formation.

We have now found that 2,2-dialkyl-3-acyloxypropanals having the general formula:

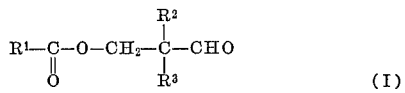

where $R^1$, $R^2$ and $R^3$ may be identical or different and each denotes an aliphatic radical, $R^1$ may also denote hydrogen or a cycloaliphatic, araliphatic or aromatic radical and/or $R^2$ and $R^3$ together with the adjacent carbon atom may be members of a cycloaliphatic ring, are obtained advantageously by reaction of a carboxylic acid with formaldehyde and a secondary aliphatic aldehyde in the presence of a strong acid when a carboxylic acid having the general formula:

$$R^1\text{—COOH} \qquad (II)$$

where $R^1$ has the meanings given above, is reacted with formaldehyde and a secondary aldehyde having the general formula:

where $R^2$ and $R^3$ have the meanings given above, with simultaneous removal of the water formed in the reaction and of any water present at the beginning of the reaction.

When acetic acid and isobutyraldehyde are used, the reaction may be represented by the following formulae:

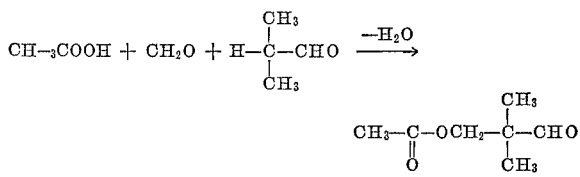

As compared with prior art methods, the process according to the invention gives 2,2-dialkyl-3-acyloxypropanals by a simpler and more economical method, in better yields and purity and without substantial resin formation. It is surprising that the reaction can be carried out at all in an anhydrous medium in solvents which have little suitability for "ion reactions" and that it proceeds at an increased speed and with higher selectivity. Aromatic carboxylic acids may also be used as starting material (II). Separation of the end product from the reaction mixture may be carried out in a simpler way without expensive fractional distillations and with less wastage of unreacted starting material (II) than in the case of U.S. Pat. 3,374,267. These advantageous results are surprising because one would have expected an increase of condensation products, irreversibly formed in an anhydrous medium, of 3-hydroxypropanal, its dimers and further amounts of formaldehyde and isobutyraldehyde, and consequently a substantially lower yield of end product.

Starting material (II) may be reacted with formaldehyde and with starting material (III) in the stoichiometric amount or in excess, preferably in a molar excess of starting material (II) to starting material (III) of from 1.2:1 to 5:1 and of formaldehyde to starting material (III) of from 1:1 to 1:1.5. Preferred starting materials (II) and (III) and consequently preferred end products (I) are those in whose formulae $R^1$, $R^2$ and $R^3$ may be different or identical and each denotes alkyl having one to eight carbon atoms, $R^1$ may also denote hydrogen, cycloalkyl having five to ten carbon atoms, aralkyl having seven to twelve carbon atoms, phenyl, naphthyl and/or $R^2$ and $R^3$ together with the adjacent carbon atom may denote members of a five-membered to eight-membered cycloalkyl ring. The said radicals and rings may bear, as substituents, groups and/or atoms which are inert under reaction conditions, for example chlorine or bromine atoms, nitro or cyano groups, alkyl or alkoxy groups having one to four carbon atoms. The alkyl radicals may be linear or branched.

The following are examples of starting materials (II) which may be used: formic acid, acetic acid, propionic acid, butyric acid, isobutyric acid, hexanoic acid, 2-ethylhexanoic acid, cyclohexyloic acid, cyclooctyloic acid, cyclododecyloic acid, monochloroacetic acid, dichloroacetic acid, trichloroacetic acid, α,α-dichlorobutyric acid, α-chloroisobutyric acid, α-bromoisobutyric acid, bromoacetic acid, iodoacetic acid, benzoic acid, 4-chlorobenzoic acid, 2,4-dichlorobenzoic acid, 3,4-dichlorobenzoic acid, p-methoxybenzoic acid, β-naphthyloic acid, phenylacetic acid, α,α-dichloropropionic acid.

The following are examples of starting materials (III): isobutyraldehyde, 2-methylbutanal, 2-methylpentanal, 2-ethylhexanal, cyclohexylaldehyde and cyclooctylaldehyde.

Formaldehyde may be used in anhydrous form as paraformaldehyde or as trioxane. It is a considerable advantage of the process according to the invention that it is possible to use cheap aqueous formaldehyde solutions. The proportion of water in the formalin solution is surprisingly separated from the reaction mixture without appreciable loss of formaldehyde and without the said beneficial results being affected.

The catalysts in the reaction may be strong acids, as a rule those having a dissociation constant of less than $10^{-3}$, for example trichloroacetic acid, phosphoric acid, cyanoacetic acid, o-bromobenzoic acid, p-chlorobenzoic acid. Arylsulfonic acids such as benzenesulfonic acid and p-toluenesulfonic acid, sulfuric acid and phosphoric acid are preferred. When the starting material (II) is itself a strong acid, it may also serve at the same time as the catalyst for the reaction. The catalyst is conveniently used in an amount of from 0.1 to 2.5% molar with reference to starting material (II).

The reaction is generally carried out at a temperature of from 40° to 150° C., preferably at from 60° to 90° C., at atmospheric or superatmospheric pressure, continuously or batchwise. It is convenient to use solvents which form azeotropes with water which boil within the said temperature range at atmospheric pressure, subatmospheric pressure or superatmospheric pressure.

Examples of suitable solvents are benzene, toluene, xylene, diisobutylene, hexane, chloroform, carbon tetrachloride. They are used in variable amounts according to the solubility of the components, as a rule in an amount of from 100 to 200% by volume based on starting material (III). Solubilizers such as dioxane and tetrahydrofuran may be used if the starting materials are only sparingly soluble. The said solvents are suitable whether the starting materials are anhydrous or contain water.

The reaction may be carried out as follows: A mixture of the starting materials with the catalyst with or without a solvent and solubilizer is kept for from half an hour to twelve hours, as a rule for from one hour to six hours, at the reaction temperature. Water formed is removed during the reaction, preferably by azeotropic distillation together with the solvent. The water may be removed in portions or advantageously continuously. Not only is the water formed removed, but also any water present at the beginning of the reaction, for example water serving as solvent for formaldehyde or water introduced in admixture with acetic acid. The end product is removed from the reaction mixture after the reaction by a conventional method, for example by distillation. The amounts of solvent and unreacted starting material (II) may be used again.

Compounds which can be prepared by the process according to the invention are valuable starting materials for the production of pesticides, polymers and dyes. They may be converted, for example by oxidation with oxygen, into the corresponding acyloxypivalic acids which may be used for example in the synthesis of herbicides employing the method described in French Pat. 1,562,410. In particular, benzoyloxypivalic acids, which are obtainable by other methods only with difficulty, can be prepared by the process according to the invention. Belgian Pat. 695,502 describes the use of the appropriate acids for the production of β-lactones and consequently of polymers. Reference may be made to the publications mentioned in the discussion of the prior art for further applications.

The following examples illustrate the invention. The parts given in the examples are parts by weight. They bear the same relation to parts by volume as the kilogram to the liter.

EXAMPLE 1

In a stirred vessel fitted with a water separator, 60 parts of paraformaldehyde, 500 parts of acetic acid and 300 parts by volume of benzene are boiled while stirring. 5 parts of p-toluenesulfonic acid is added and 144 parts of isobutyraldehyde is allowed to flow in in portions. 61 parts of a mixture of water and acetic acid having a content of 36 parts of water separates in the water separator over a period of fifteen hours. Then benzene and the unreacted acetic acid (345 parts) are distilled off at atmospheric pressure up to a boiling temperature of 145° C. Distillation of the mixture at 16 mm. Hg finally gives 276 parts (96% of theory with reference to isobutyraldehyde and formaldehyde) of acetoxypivalaldehyde having a boiling point of 78° C.

COMPARATIVE EXAMPLE 1a 60 parts of paraformaldehyde, 1240 parts by volume of acetic acid, 144 parts of isobutyraldehyde and 15 parts of sulfuric acid are heated for six hours at 70° C. without removing water, cooled and poured into 1300 parts by volume of water. The organic phase and the extracts of the aqueous phase with ether are united, washed with 200 parts by volume of a saturated common salt solution and dried with anhydrous sodium sulfate. Fractionation of the organic solution at 15 mm. gives 153 parts (about 53% of theory) of a mixture of acetoxypivalaldehyde and hydroxypivalaldehyde (molar ratio of about 9:1) having a boiling point of from 76° to 84° C.

EXAMPLE 2

800 parts of acetic acid, 300 parts by volume of benzene, 200 parts of a 37% by weight aqueous formaldehyde solution, 144 parts of isobutyraldehyde and 5 parts of p-toluenesulfonic acid are boiled in a stirred vessel fitted with a water separator until completion of water separation. The mixture is worked up analogously to Example 1, 262 parts (91% of theory based on isobutyraldehyde) of acetoxypivalaldehyde is obtained at from 70° to 72° C. and 12 mm.

EXAMPLE 3

While stirring, 700 parts of 99.5% formic acid, 300 parts by volume of benzene, 60 parts of paraformaldehyde, 144 parts of isobutyraldehyde and 4 parts of p-toluenesulfonic acid are boiled in a stirred vessel fitted with a water separator until completion of water separation (about four hours). The mixture is fractionated through a column filled with glass packing. 250 parts (96% of theory based on isobutyraldehyde and formaldehyde) of formyloxypivalaldehyde is obtained having a boiling point of 74° C. at 18 mm.

EXAMPLE 4

As described in Example 3, 486 parts of trichloroacetic acid, 30 parts of paraformaldehyde and 72 parts of isobutyraldehyde in 150 parts by volume of benzene are boiled until completion of water separation (two to three hours). The mixture is distilled. 151 parts (61.4% of theory based on formaldehyde and isobutyraldehyde) of trichloroacetoxypivalaldehyde is obtained as a colorless liquid having a boiling point of 129° C. at 15 mm.

EXAMPLE 5

As described in Example 3, 282 parts of chloroacetic acid, 30 parts of paraformaldehyde and 72 parts of isobutyraldehyde, 150 parts of benzene and 2 parts of p-toluenesulfonic acid are boiled until the separation of water is ended (three to four hours). The mixture is distilled through a column filled with glass packing. 133 parts (74.6% of theory with reference to formaldehyde and isobutyraldehyde) of chloroacetoxypivalaldehyde is obtained having a boiling point of from 118° to 120° C. at 13 mm.

EXAMPLE 6

As described in Example 5, 384 parts of dichloroacetic acid, 30 parts of paraformaldehyde and 144 parts of isobutyraldehyde are condensed in the presence of 3 parts of p-toluenesulfonic acid. The mixture is distilled. 138.5 parts (65.1% of theory, with reference to formaldehyde and isobutyraldehyde) of dichloroacetoxypivalaldehyde is obtained having a boiling point of 68° C. at 0.3 mm.

EXAMPLE 7

As in Example 5, 426 parts of α,α-dichloropropionic acid, 30 parts of paraformaldehyde and 72 parts of isobutyraldehyde are condensed for about four hours in the presence of 3 parts of p-toluenesulfonic acid. The mixture is distilled. 141 parts (62.4% of theory with reference to formaldehyde and isobutyraldehyde) of α,α-dichloropropionyloxypivalaldehyde is obtained having a boiling point of 76° C. at 0.3 mm.

EXAMPLE 8

As described in Example 5, 530 parts of isobutyric acid, 30 parts of paraformaldehyde and 72 parts of isobutyraldehyde are condensed in the presence of 5 parts of p-toluenesulfonic acid. 127.5 parts (74% of theory based on formaldehyde and isobutyraldehyde) of isobutyryloxypivalaldehyde is obtained having a boiling point of 100° C. at 20 mm.

EXAMPLE 9

As described in Example 5, 300 parts of acetic acid, 30 parts of paraformaldehyde and 100 parts of 2-methylpentanal are condensed in the presence of 3 parts of p-toluenesulfonic acid. The mixture is distilled. 153 parts (88.8% of theory with reference to formaldehyde and 2-methylpentanal) of 2-methyl-2-n-propyl-3-acetoxypropanal is obtained having a boiling point of 105° C. at 16 mm.

EXAMPLE 10

As described in Example 5, 300 parts of acetic acid, 30 parts of paraformaldehyde and 128 parts of 2-ethylhexanal are condensed in the presence of 3 parts of p-toluenesulfonic acid. The mixture is distilled. 155.5 parts (76.2% of theory with reference to formaldehyde and 2-ethylhexanal) of 2-ethyl-2-n-butyl-3-acetoxypropanal is obtained having a boiling point of 120° C. at 20 mm.

EXAMPLE 11

As described in Example 5, 300 parts of acetic acid, 30 parts of paraformaldehyde and 112 parts of cyclohexylaldehyde are condensed in the presence of 3 parts of p-toluenesulfonic acid. The mixture is distilled. 148 parts (80% of theory based on formaldehyde and cyclohexylaldehyde) of 1 - acetoxymethylhexahydrobenzaldehyde is obtained having a boiling point of 99° to 100° C. at 6 mm.

EXAMPLE 12

As described in Example 5, 366 parts of benzoic acid, 30 parts of paraformaldehyde and 72 parts of isobutyraldehyde are condensed in 500 parts of benzene in the presence of 10 parts of p-toluenesulfonic acid for twelve hours. The mixture is distilled. 99 parts (51% of theory with reference to formaldehyde and isobutyraldehyde) of benzoyloxypivalaldehyde is obtained having a boiling point of 170° C. at 20 mm.

EXAMPLE 13

As described in Example 5, 380 parts of 3,4-dichlorobenzoic acid, 30 parts of paraformaldehyde and 72 parts of isobutyraldehyde are condensed in 500 parts of benzene in the presence of 10 parts of p-toluenesulfonic acid for twelve hours. The mixture is distilled. 110 parts (42% of the theory with reference to paraformaldehyde and isobutyraldehyde) of 3,4-dichlorobenzoyloxypivalaldehyde is obtained having a boiling point of 165° to 167° C. at 1 mm. The melting point is 45° to 46° C. (recrystallized from petroleum ether).

EXAMPLE 14

As described in Example 5, 285 parts of 2,4-dichlorobenzoic acid, 30 parts of paraformaldehyde and 72 parts of isobutyraldehyde are condensed in 500 parts of benzene in the presence of 10 parts of p-toluenesulfonic acid for twelve hours. 81 parts (31.8% of the theory with reference to formaldehyde and isobutyraldehyde) of 2,4-dichlorobenzoyloxypivalaldehyde having a boiling point of 165° to 168° C. at 1 mm. is obtained by distilling the mixture. The melting point is 47° to 48° C. (recrystallized from petroleum ether).

We claim:

1. A process for the production of 2,2-dialkyl-3-acyloxypropanals having the general formula:

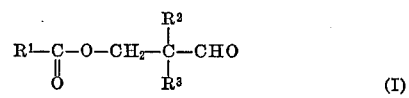

where $R^1$, $R^2$ and $R^3$ may be identical or different and each may denote an aliphatic radical, $R^1$ may also denote hydrogen, a cycloaliphatic, araliphatic, or aromatic radical and/or $R^2$ and $R^3$, together with the adjacent carbon atom, denote members of a cycloaliphatic ring, by reaction of a carboxylic acid with formaldehyde and a secondary aliphatic aldehyde in the presence of a strong acid having a dissociation constant of less than $10^{-3}$, wherein at least a stoichiometric amount of a carboxylic acid having the general formula:

where $R^1$ has the above meanings, is reacted with formaldehyde and a secondary aldehyde having the general formula:

where $R^2$ and $R^3$ have the above meanings, and simultaneously removing water formed in the reaction and any water present at the beginning of the reaction by conducting the reaction in a solvent which forms with water an azeotrope which boils during the reaction.

2. A process as claimed in claim 1 wherein the reaction is carried out in a molar ratio of starting material (II) to starting material (III) of from 1.2:1 to 5:1 and of formaldehyde to starting material (II) of from 1:1 to 1:1.5.

3. A process as claimed in claim 1 wherein the catalyst is used in an amount of from 0.1 to 2.5% molar with reference to starting material (II).

4. A process as claimed in claim 1 carried out at a temperature of from 40° to 150° C.

5. A process as claimed in claim 1 carried out at a temperature of from 60° to 90° C.

6. A process as claimed in claim 1 carried out in the presence of said solvent in an amount of from 100 to 200% by volume with reference to starting material (III).

7. A process as claimed in claim 1 wherein the reaction is carried out in a molar ratio of starting material (II) to starting material (III) of from 1.2:1 to 5:1 and of formaldehyde to starting material (II) of from 1:1 to 1:1.5, the catalyst is used in an amount of from 0.1 to 2.5% molar with reference to starting material (II), the reaction temperature is 40–150° C., and $R^1$, $R^2$ and $R^3$ each denotes alkyl having one to eight carbon atoms, $R^1$ may also denote hydrogen, cycloalkyl having five to ten carbon atoms, aralkyl having seven to twelve carbon atoms, phenyl, or naphthyl or said groups having, as substituents, chlorine, bromine, nitro, cyano, alkyl or alkoxy having 1–4 carbon atoms.

8. A process as claimed in claim 1 wherein starting material (II) is formic acid, acetic acid, propionic acid, butyric acid, isobutyric acid, hexanoic acid, 2-ethylhexanoic acid, cyclohexyloic acid, cyclooctyloic acid, cyclododecyloic acid, monochloroacetic acid, dichloroacetic acid, trichloroacetic acid, $\alpha,\alpha$-dichlorobutyric acid, $\alpha$-chloroisobutyric acid, $\alpha$-bromoisobutyric acid, bromoacetic acid, iodoacetic acid, benzoic acid, 4-chlorobenzoic acid, 2,4-dichlorobenzoic acid, 3,4-dichlorobenzoic acid, or p-methoxybenzoic acid, $\beta$-naphthyloic acid, phenylacetic acid, $\alpha,\alpha$-dichloropropionic acid and starting material (III) is isobutyraldehyde, 2-methylbutanal, 2-methylpentanal, 2-ethylhexanal, cyclohexylaldehyde or cyclooctylaldehyde.

References Cited

UNITED STATES PATENTS 3,374,267  3/1968  Tan _____ 260—494

LORRAINE A. WEINBERGER, Primary Examiner

R. D. KELLY, Assistant Examiner

U.S. Cl. X.R.

260—465 D, 465.4, 469, 471 R, 471 A, 473 R, 476 R, 484 R, 487, 494